(12) United States Patent
Taylor

(10) Patent No.: US 7,779,457 B2
(45) Date of Patent: Aug. 17, 2010

(54) IDENTITY VERIFICATION SYSTEM

(75) Inventor: John M. Taylor, Millbrae, CA (US)

(73) Assignee: Identifid, Inc, Overland Park, KS (US)

( * ) Notice: Subject to any disclaimer, the term of this patent is extended or adjusted under 35 U.S.C. 154(b) by 1120 days.

(21) Appl. No.: 11/150,355

(22) Filed: Jun. 9, 2005

(65) Prior Publication Data

US 2006/0101508 A1    May 11, 2006

Related U.S. Application Data

(60) Provisional application No. 60/578,453, filed on Jun. 9, 2004.

(51) Int. Cl.
*G06F 17/30*    (2006.01)
(52) U.S. Cl. .................................. 726/7; 713/186
(58) Field of Classification Search ........................ None
See application file for complete search history.

(56) References Cited

U.S. PATENT DOCUMENTS

| | | | |
|---|---|---|---|
| 4,821,118 A | 4/1989 | Lafreniere | |
| 4,993,068 A | 2/1991 | Piosenka et al. | |
| 4,995,086 A | 2/1991 | Lilley et al. | |
| 5,054,089 A | 10/1991 | Uchida et al. | |
| 5,095,194 A | 3/1992 | Barbanell | |
| 5,109,427 A | 4/1992 | Yang | |
| 5,109,428 A | 4/1992 | Igaki et al. | |
| 5,144,680 A | 9/1992 | Kobayashi et al. | |
| 5,146,102 A | 9/1992 | Higuchi et al. | |
| 5,180,901 A | 1/1993 | Hiramatsu | |
| 5,210,588 A | 5/1993 | Lee | |
| 5,210,797 A | 5/1993 | Usui et al. | |
| 5,222,152 A | 6/1993 | Fishbine et al. | |
| 5,230,025 A | 7/1993 | Fishbine et al. | |
| 5,241,606 A | 8/1993 | Horie | |
| 5,265,162 A | 11/1993 | Bush et al. | |
| 5,321,242 A | 6/1994 | Heath, Jr. | |
| 5,325,442 A | 6/1994 | Knapp | |
| 5,351,303 A | 9/1994 | Willmore | |
| 6,026,166 A | 2/2000 | LeBourgeois | |
| 6,307,956 B1 | 10/2001 | Black | |
| 6,366,682 B1 * | 4/2002 | Hoffman et al. | 382/115 |
| 6,789,189 B2 | 9/2004 | Wheeler et al. | |
| 6,820,202 B1 | 11/2004 | Wheeler et al. | |
| 6,879,966 B1 | 4/2005 | Lapsley et al. | |
| 7,203,315 B1 * | 4/2007 | Livesay | 380/255 |
| 2003/0052768 A1 * | 3/2003 | Maune | 340/5.53 |

OTHER PUBLICATIONS

PCT/US05/20416 International Search Report and Written Opinion; Oct. 21, 2005; 6 pages.
PCT/US05/20416 International Preliminary Report on Patentability Chapter I; Dec. 14, 2006; 6 pages.

* cited by examiner

*Primary Examiner*—Brandon S Hoffman

(57) ABSTRACT

An electronic system is provided to confirm the identity of an individual or customer. The confirmation process permits businesses and other entities to access a preapproved list of authorize customers for purposes of preventing identity theft or fraud. Biometric data obtained from the person of the customer is compared against an authorized version of customer biometric data for this purpose. Even if an individual customer is not an authorized customer, the biometric data may be compared to a known fraud database to see if this individual has perpetrated past instances of fraud.

24 Claims, 9 Drawing Sheets

IDENTITY VERIFICATION SYSTEM

RELATED APPLICATIONS

This application claims benefit of priority to U.S. provisional patent application Ser. No. 60/578,453 filed Jun. 9, 2004, which is hereby incorporated by reference to the same extent as though fully replicated herein.

BACKGROUND

1. Field of the Invention

The invention pertains to electronic systems that may be used to verify the identity of a person. More particularly, a module or subcomponent of the electronic systems may be used for this purpose, to facilitate or enhance an overall system functionality.

2. Description of the Related Art

Identity theft is the fastest growing crime according to a recent Federal Trade Commission (FTC) report, Federal Trade Commission Identity Theft Report. The cost of this crime in the United States alone totaled over 50 billion dollars during 2003. Businesses and financial institutions lost approximately 47 billion dollars, and individual victims lost an additional 5 billion dollars over the course of that year. Almost ten million individuals in the United States were victims of such theft. These losses are exacerbated by the additional loss of more than 297 million personal hours, which were also spent by individuals who were affected by the consequences of such fraud. As high as those numbers may seem, it is estimated that a large percentage of identity theft goes unreported to the FTC. The true total losses may be even higher than the reported values. This crime may be perpetrated using relatively low-technology means, and offers the offender a high-payoff with a low chance of being caught and prosecuted. If the current trends remain unchecked, the costs of this increasingly organized crime will escalate about 300% annually. Identity theft occurs when a criminal obtains personal data in the name of the identity victim, and uses that information to obtain credit, merchandise, and services. The personal data is most often social security numbers and drivers' license numbers.

Businesses and financial institutions typically shoulder the financial burden of this crime. Though these losses have for years been considered part of the "price of doing business", the growing rate of identity theft is pushing the costs of shouldering this burden too high for these businesses to sustain. In the year covered in the FTC report, businesses and financial institutions lost an average of $4,800 per victim, or about 47.6 billion dollars. This amount does not account for costs associated with fighting this crime, including for some institutions the sustenance of entire operating departments.

Identity theft has affected approximately 4.6% of the United States population in the past year, or about 9.91 million people. About 12.7% of the population has discovered they have been victims within the last five years. Even more people have heard of and are worried about identity theft. The crime produces an aftermath that is frustrating, time consuming, costly, and a major contributor to psychological and personal damage. This is why the financial aspect of the crime is not generally perceived as the worst issue confronting victims. About 21% of the victims report continuing problems from the theft. Statistically, 20% of victims report having trouble obtaining or using credit cards as a result of being affected by identity theft. Twenty percent report being harassed by a debt collector. Eighteen percent report being turned down for a loan. Thirteen percent have had other banking problems, such as being turned down for new accounts or having checks rejected.

The FTC report categorizes the different types of identity theft. The two main categories are new accounts opened by identity thieves, and misuse of existing accounts. A third category is misuse of the stolen identity in non-financial ways.

Although the opening of new accounts is not the most common form of identity theft, with 17% or 3.23 million victims, this manner of theft is the most costly category for victims, businesses, and financial institutions. At an average of $10,200 per victim loss to businesses and financial institutions, this type of fraud cost a total of 32.9 billion dollars. Out-of-pocket expenses for individuals victimized by identity theft averaged $1180 and 60 hours spent resolving various problems. Total victim costs reached 3.8 billion dollars and 194 million hours.

The most common type of new account fraud by identity thieves is the opening of credit card accounts. Almost 800,000 people are estimated to have had credit cards opened fraudulently in their names. Table 1 shows the relative frequency of new account abuse.

TABLE 1

Relative frequency of new account abuse

| Type of Abuse By Account Type | Percent Of all Identity Theft Victims |
|---|---|
| Credit Cards | 8% |
| Loans | 5% |
| Telephone Service | 5% |
| Checking/Savings | 3% |
| Internet | 2% |
| Insurance | 1% |
| Other Accounts | 1% |

Misuse of existing accounts is by far the most common form of identity fraud, affecting about 85% or 6.68 million of the individual victims. However, the costs on a per victim basis are less. Costs average $2,100 per victim, and this represents a $14 billion total loss to businesses and financial institutions. Costs to individuals average $160 out-of-pocket and 15 hours spent resolving problems, for a total of $1.1 billion and 100 million hours lost. The largest percentage of this type of abuse by far is the misuse of existing credit cards, accounting for over three-quarters, or 2.4%, of the 3.1% of the U.S. population that has been so victimized. Table 2 shows the relative frequency of existing account abuse.

TABLE 2

Relative frequency of existing account abuse

| Type of Abuse By Account Type | Percent Of all Identity Theft Victims |
|---|---|
| Credit Cards | 67% |
| Checking/Savings | 19% |
| Telephone Service | 9% |
| Internet | 3% |
| Insurance | 2% |

About 1.5 million people, or 15% of all identity victims, report their information being used in other non-financial ways:

4% of victims report that thieves have used their information as identification after being caught committing a crime;

3% of thieves use the information to obtain government documents, such as driver's licenses or social security cards;

2% of thieves use the information to rent housing;

2% of thieves use the information to receive medical care;

2% of thieves use the information for employment;

2% of thieves use the information to file false tax returns in the victim's name; and 7% of victims report other misuse.

Table 3 provides a breakdown of the costs that associated with identity theft by various victim categories and types of abuse.

TABLE 3

Identity theft cost breakdown

|  | New Accounts Opened | Misuse of Existing Accounts | All ID Theft |
|---|---|---|---|
| Victims in Year |  |  |  |
| Percent of Population | 1.5% | Credit Card 2.4% Non Credit Card 0.7% | 4.6% |
| Total Number | 3.23 million | 6.68 million | 9.91 million |
| Business & Financial Institutions Loss |  |  |  |
| Average per Incident | $10,200 | $2,100 | $4,800 |
| Total | $32.9 billion | $14.0 billion | $47.6 billion |
| Victims direct expenses |  |  |  |
| Average per Victim | $1,180 | $160 | $500 |
| Total | $3.8 billion | $1.1 billion | $5.0 billion |
| Average Hours Spent | 60 hours | 15 hours | 30 hours |
| Total | 164 million hours | 100 million hours | 297 million hours |

The problem is severe, but some countermeasures do exist. One remedy is for people to frequently check or monitor their credit reports. An individual may make direct requests to the credit agencies or through one of many services, and thereby obtain a copy of their credit report to monitor suspicious activities or accounts. It is also possible for an individual to place a "fraud alert" on his or her credit report. Once an alert is placed, financial institutions are prevented from opening accounts without first mailing confirmations to the address on the credit report to confirm or authorize the opening of the new account.

Banks have begun advertising similar services in a variety of areas. Accounts may be monitored for unusual activity. For example, a lending institution or credit card agency may monitor existing accounts for unusual spending activity. Once activity is detected, the bank may hold transactions until they can contact their customer. Individuals should also monitor their account statements. By paying close attention to credit card and bank statements, unauthorized use is more quickly detected. Preventative measures may include placing a photograph of the account holder on credit cards, and the shredding of personal documents and mail that contain personal-identifying information.

The measures discussed above are primarily reactive monitoring measures, and they do not equate to being protected. Of new account fraud victims, 17% were already aware that their information had been taken. At least 8% of existing "credit card only" fraud victims, and 9% of other existing account fraud victims, were also aware of the theft of their identity before discovering the extent of the fraud. Five percent of all victims stated that the abuse was still continuing. Two percent did not know for sure if it had stopped. The situation is worse for those victims that had four or more cases of abuse. For those people, 13% stated the abuse was continuing and another 4% did not know if it had stopped. Photographs on credit cards or bank accounts may protect that card or a customer's accounts at a specific bank, but they do not prevent a thief from opening accounts with other banks. While these reactive steps are important and can mitigate the expense of existing identity theft, in most cases they still do not prevent the initial theft from occurring.

Electronic systems may be equipped to combat identity theft; however, the magnitude of the problem shows that current implementations are largely ineffective measures.

The systems that have been proposed and/or implemented fail for a number of reasons, but key issues include complexity, lack of standardization, and security risks that devolve from the transmission of sensitive information.

In one example, U.S. Pat. No. 6,879,966 issued to Lapsley et al. describes a system for tokenless biometric electronic transactions that are confirmed by a third party identifier. In this type of transaction, the payor inputs biometric data that is obtained from the payor's person. The biometric data may be fingerprints, hand prints, voice prints, retinal images, facial scans or handwriting samples. Lapsley '966 recognizes that information which is obtained from the payor's person may be checked against pre-confirmed data that is stored on a token, such as a magnetic swipe card or smart card. This creates a security risk, according to Lapsley et al., because either the comparison and verification process is not isolated from the hardware and software that is directly used by the payor who is attempting access, or because the user's financial data is stored directly on the token.

Examples of a biometric approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al., U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; and U.S. Pat. No. 5,351, 303 to Willmore. Due to the inherent risks of having this data available to a local electronic reading system, Lapsley et al. proposes to maintain the biometric verification data and financial data at a remote site that performs verification on the basis of data obtained from the payor's person. This scheme results in the transmission of financial account identifiers, which itself results in an additional security risk.

SUMMARY

The present instrumentalities advance the art and overcome the problems outlined above by providing an electronic system that confirms the identity of a person without the attendant risks that are inherent to the prior at. The electronic system may, for example, be implemented as a module of program instructions that interface with an existing electronic system that is used for other purposes. The instrumentalities for obtaining these advantages may include program instructions on a computer system. These may be supplemented by the use of hardware or circuitry in any configuration. The system environment may include a single processor or multiple processors in a distributed processing environment. Data storage may occur on a single storage media with redundant backup, or in a distributed databasing environment.

In one aspect, the electronic system and program instructions provide for preauthorizing a group of customers by storing an authorized version of biometric data and an authorized version of non-biometric data that may be used to verify the identity of individual customers. The system facilitates obtaining data from the person of an individual who wishes to engage in a transaction, the data including test biometric data and test non-biometric data that may be used to identify the individual. The system transmits the data to a central agency, which processes the data to determine whether the individual is also a preapproved customer. The manner of processing at least includes comparing the test biometric data against the authorized version of biometric data such that a comparison match outcome is associated with recognition of the individual as a customer and a comparison non-match outcome is associated with nonrecognition of the individual as a customer. The system may be implemented as an independent agency that notifies others of the comparison match outcome. To streamline processing, the central agency may processes the test non-biometric data to determine a data work flow before engaging in the comparison analysis of biometric data.

The biometric data may be obtained, for example, by use of a biometric scanner and may be fingerprint, palm, face, or iris data, or a combination thereof. The biometric scanner may be located in the individual's home or in a place of business.

Respective user communities of customers and business partners may be connected to the central agency via the Internet.

The central agency may be provided with a known fraud database that contains historical biometric data which is associated with known or suspected instances of past fraud. Even if the individual under test is not a customer, the transaction may be authorized by comparing the test biometric data to historical biometric data from known instances of past fraud and so obtain a comparison outcome. A comparison match triggers notification that the test biometric data is associated with an instance of past fraud.

A business or other entity may accept the respective comparison outcomes that are discussed above and proceed or not proceed to complete a transaction on the basis of this information. In various embodiments, the type of transaction may facilitate a function selected from the group consisting of credit card applications; loan applications; opening savings or checking accounts; accessing savings or checking accounts; activating new cellular phone service; obtaining new insurance; obtaining government documents; renting housing; receiving medical care; confirming employment applications; car dealership transactions, safety deposit boxes; medical applications including access to medical records, prescriptions, and patient tracking; government programs including passports or visas, entitlement programs; frequent traveler programs; prisoner tracking; and tax filings. In still other embodiments, the type of transaction may facilitate access to a secure facility or the granting of admittance of the individual to a country.

A proxy server may be provided to protect the central agency against malicious attack. This may be done in consequence of the central agency functioning in a distributed environment where data processing is divided among a plurality of zones on the basis of geographical association to the data.

DETAILED DESCRIPTION

There will now be shown and described an electronic system that functions as an identity confirmation agent.

Figure 1:
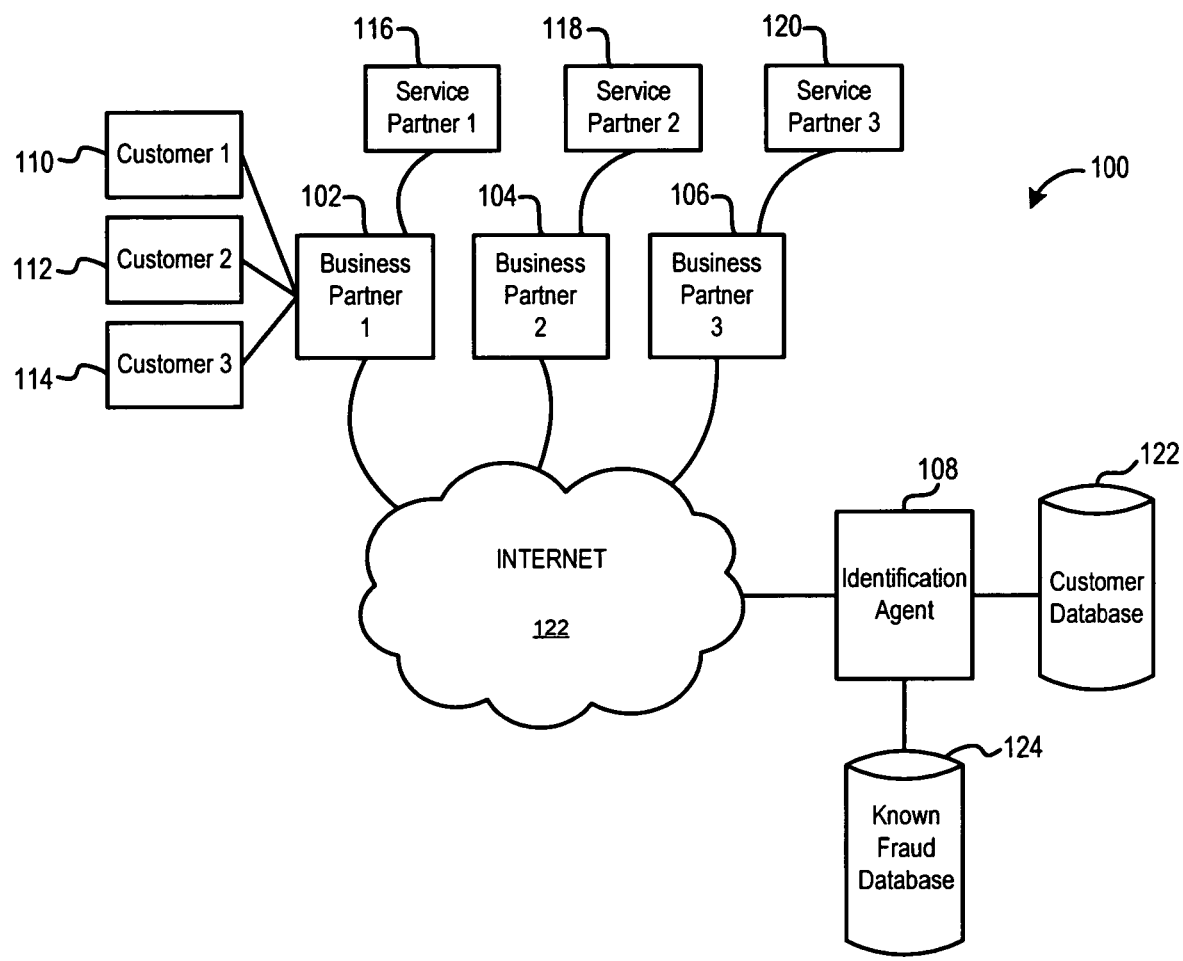
FIG. 1 is a diagram of an electronic system incorporating an identity confirmation agent.

FIG. 1 shows an identity confirmation system 100 that permits a plurality of business partners to interact with an identity confirmation agent 108. Each of the business partners may use the identity confirmation agent 108 to confirm the identity of customers, such as customer 110, 112, 114 of business partner 102. Service partners 116, 118, 120 may be third party vendors who provide software, such as transactional software to the business partners 102, 104, 106. Communications as shown are via the Internet, but this may be any other manner of telecommunications. It is apparent from FIG. 1, although this is only one embodiment, that the business partners may use the identity confirmation agent at a central remote location to confirm or deny the identity of customers 112, 114, 116. This confirmation or denial may be in context of a financial transaction, a purchase, an immigration entry, or authorized entry into a secure facility. The third party software from service partners 116, 118, 120 may be configured to interface with a program module to confirm or deny such transactions from the identity confirmation agent 108.

In one aspect, the identity confirmation agent 108 may be an agent 108 that is independent of any other system, except as may be facilitated by a protocol converter to facilitate the exchange of electronic data between the respective systems. An agent of this type may be, for example, independent of any individual bank, financial institution or government agency. The agent may provide a central point for confirming identity, such that an individual would only need to sign up for one identity protection account and receive automatic protection at all participating businesses and financial institutions worldwide. This type of central standard prevents these businesses and financial institutions from being fraudulently induced to extend credit or services. In one example, a person who has protected his or her identity in the State of Washington would be protected from the possibility of a thief opening accounts in Miami, London, or Tokyo.

According to one embodiment, an identity confirmation agent 108 electronically confirms or denies the identity of an individual customer 112, 114, 116 by using a combination of biometric data and personal information. This identity confirmation agent 108 may be implemented as a module of program instructions that operate independently of various financial institutions, businesses or government agencies that use or subscribe to an identity confirmation service. A customer database 122 may contain information associated with a plurality of enrolled individuals, which are referred to herein as "customers." The customer database 122 may also contain information associated with businesses, financial institutions, and government agencies, which collectively are referred to herein as "business partners." The service may be facilitated by third parties including software companies, consultant groups and integrators, which are referred to herein as "system partners." The identity confirmation agent 108 may also access a known fraud database 124, which contains biometric data that has been obtained from persons who have perpetrated or attempted to perpetrate fraud on the electronic system 100, as well as other data that may be provided from instances of fraud outside of the electronic system 100.

Customers may enroll in or subscribe to a service that utilizes the program module and database 122 to protect their identities. The database 122 contains identifying information, for example, where a customer account associates an individual's social security number or other national identification number for those countries not issuing social security numbers, with a unique identifying number that is issued by the identity confirmation agent. The identifying number may be further associated with biometric data that is unique to the customer, such as a digital photograph, fingerprint, and/or an iris image.

Business partners 102, 104, 106 may use the identity confirmation agent 108 to protect themselves from losses that would otherwise arise through identity theft and fraud. By confirming the identity of their customers 112, 114, 116, the business partners 102, 104, 106 prevent fraud. In this manner the customers are also protected from having fraud committed in their name.

The system partners 116, 118, 120 may integrate the program module into their own software products. In one example, a data protocol converter may facilitate access to the identity confirmation agent in a standardized way that facilitates the addition of an identity confirmation functionality to a wide array of software programs.

Where the identity confirmation agent 108 operates at a central control location, an individual customer need only sign up for one identity protection account to be automatically protected at all participating businesses and financial institutions worldwide. Businesses and financial institutions are protected from extending fraudulent credit or services because they are able to confirm an identity no matter where the individual signed up. In one example, a person that has enrolled and protected their identity in the State of Washington would be protected from an identity thief who is attempting to open an account in their name in Florida.

The service may operate in two modes to accommodate customers and non-customers. When a putative customer accesses the identity confirmation agent, biometric data is collected from the putative customer's person. This data may be used to confirm or deny the putative customer's identity. The biometric data may be collected, regardless of whether the individual purports to be a customer. Biometric data that is obtained from persons who are not enrolled as customers may be checked against a "known fraud database," i.e. a registry of biometric data that has been collected from persons who have previously committed fraud upon the business partners. This manner of checking non-customers prevents the entire community of business partners from the perpetration of repeated fraud following any one instance of fraud.

It will be appreciated that there are a number of commercially available biometric identification technologies. Available technologies include, for example, iris, fingerprint, palm, voice and facial recognition engines as formats. Broadly speaking, the precise manner of biometric identification technology is unimportant, although it will be further appreciated that the different technologies each have their respective advantages and disadvantages, and that there are emerging new technologies and improvements. At the present time, it is preferred that fingerprint and iris data are taken from each customer at enrollment.

Figure 2:
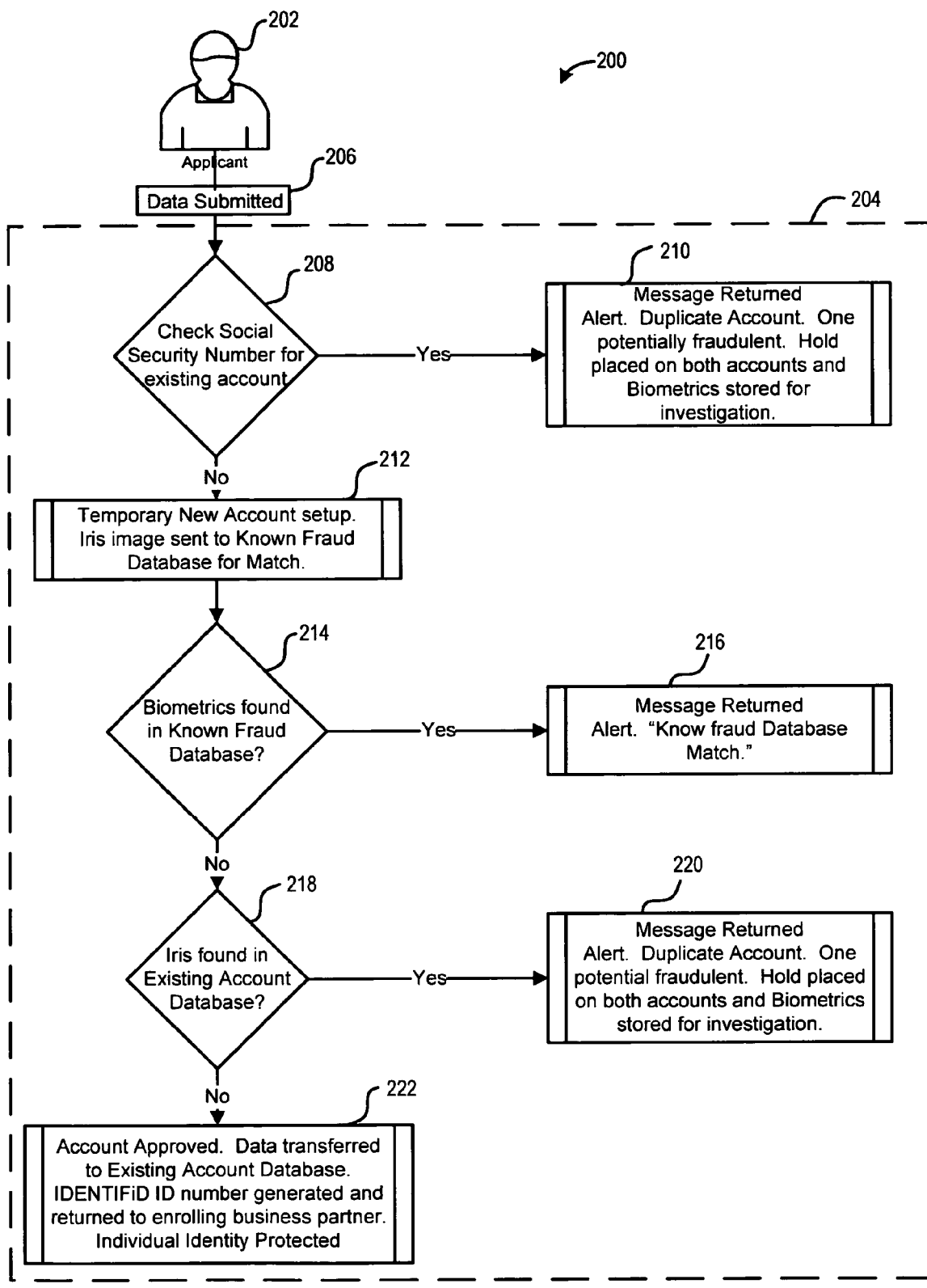
FIG. 2 is a work process diagram of a new customer authorization or enrollment functionality that may be provided by the identity confirmation agent.

FIG. 2 shows an enrollment business process 200. An individual applicant 202 wishing to protect his or her identity goes to a participating business partner (not shown) to register with an enrollment module 204 of the identity confirmation agent 108. The business partner collects from the applicant 202 data 206 and submits the data 206 to the enrollment module 204 using a telecommunications linkage (not shown). The data 206 may include, for example, the data that is shown in Table 4, which is regarded as the minimum data that is amenable for all uses in a worldwide identification system; however, only a single form of biometric data is required in this minimal sense.

TABLE 4

| Personal Identification Data | |
|---|---|
| Index Keys for Looking Up An Individual | Biometric Data For Confirmation |
| Country of Residence | Fingerprint record |
| Country Unique Identity Number (example: Social Security Number US) | Iris record |
| Passport Number | Digital photo |

The enrollment module 204 reviews the data 206 for authenticity. This review confirms that all fields are complete and are of the correct data type and length that is expected. Once this review is complete and the data format has been confirmed, the customer account is enabled. In this example, step 208 ascertains whether database 122 contains a match for the customer social security number. If there is an existing match, the enrollment module takes action 210 informing the business partner that an alert is established because of a duplicate account. This situation indicates potential fraud because an existing customer should know that they already have an account. In this instance, the enrollment module 204 provides notice to the identity confirmation agent to freeze both accounts until the uncertainty is resolved by manual operator interaction. The biometric data from the applicant 202 is stored for possible future use in a known fraud database to block all transactions that are associated with this biometric data.

If there is no match on the social security number, processing continues to a new account setup mode. The biometric data, which is obtained from the person of applicant 202 and may be for example an iris scan, is sent to the identity confirmation agent 108 for comparison to existing data in the known fraud database. In step 214, if the biometric data matches data that is associated with an instance of fraud in the known fraud database, the enrollment module 204 returns a message to the business partner that there is a known fraud database match. Where no such match occurs, step 218 queries the identity confirmation agent 108 to ascertain whether the biometric data duplicates that of any other existing customer account. If so, step 220 alerts the business partner that this is an instance of possible fraud and provides notice to the identity confirmation agent to freeze both accounts until the uncertainty is resolved by manual operator interaction. The biometric data from the applicant 202 is stored for possible future use in a known fraud database to block all transactions that are associated with this biometric data.

If there is no match in step 220, the enrollment module approves the applicant for the opening of a new account. The applicant 202 is authorized as a customer, and may be assigned a unique customer identifier. As used herein this unique identifier is called the IDENTIFID identifier, and may be in an alphanumeric form that is randomly generated by the identity confirmation agent 108. Alternatively, the applicant 202 may be prompted to provide an IDENTIFID identifier according to personal preference that is easier for the applicant 202 to remember, but this manner of IDENTIFID identifier must be checked to confirm that it is unique to the particular customer. Future transactions may proceed under the auspices of the IDENTIFID identifier alone to protect the customer identity by never transmitting the customer identity, for example, on the electronic system 100 together with sensitive personal or financial information. The customer then has an active account on database 122 and is authorized to perform future transactions as a customer on the electronic system 100.

Returning now to FIG. 1, once the business partners 102, 104, 106 have integrated into their respective information systems a module that permits these systems to communicate with the identity confirmation agent 108, they are able to verify the identities of individuals before opening new accounts, giving access to existing accounts, or extending services to prospective customers. When an individual presents his or her self to the business partner, the usual case is that the individual claims to have an identity that is backed by some form of identification. In one instance, a business partner may be presented with a social security number, driver's license number or IDENTIFID identifier. As a consequence of a transaction that is underway, the business partner obtains biometric data from the person of the prospective customer and links this biometric information with the authorized customers' known biometric data by the action of identity confirmation agent 108 reporting on customer database 122. Another example is the individual may present a business partner account number, such as a checking account number, together with biometric data that is obtained from the person of the individual. The business partner may associate the account number with the IDENTIFID identifier, which does not necessarily ever need to be in the possession of the individual. Interaction with the identity confirmation agent 108 may proceed directly with the business partner on this basis.

Common uses of the electronic system 100 may proceed this way, for example, to process transactions for: credit card applications; loan applications; opening savings or checking accounts; accessing savings or checking accounts; activating new cellular phone service; obtaining new insurance; obtaining government documents; renting housing; receiving medical care; confirming employment applications; car dealership transactions, safety deposit boxes; medical applications including access to medical records, prescriptions, and patient tracking; government programs including passports or visas, entitlement programs (such as Welfare, Medicare, Food Stamps, Social Security, etc.); frequent traveler programs; prisoner tracking; and tax filings.

Figure 3:
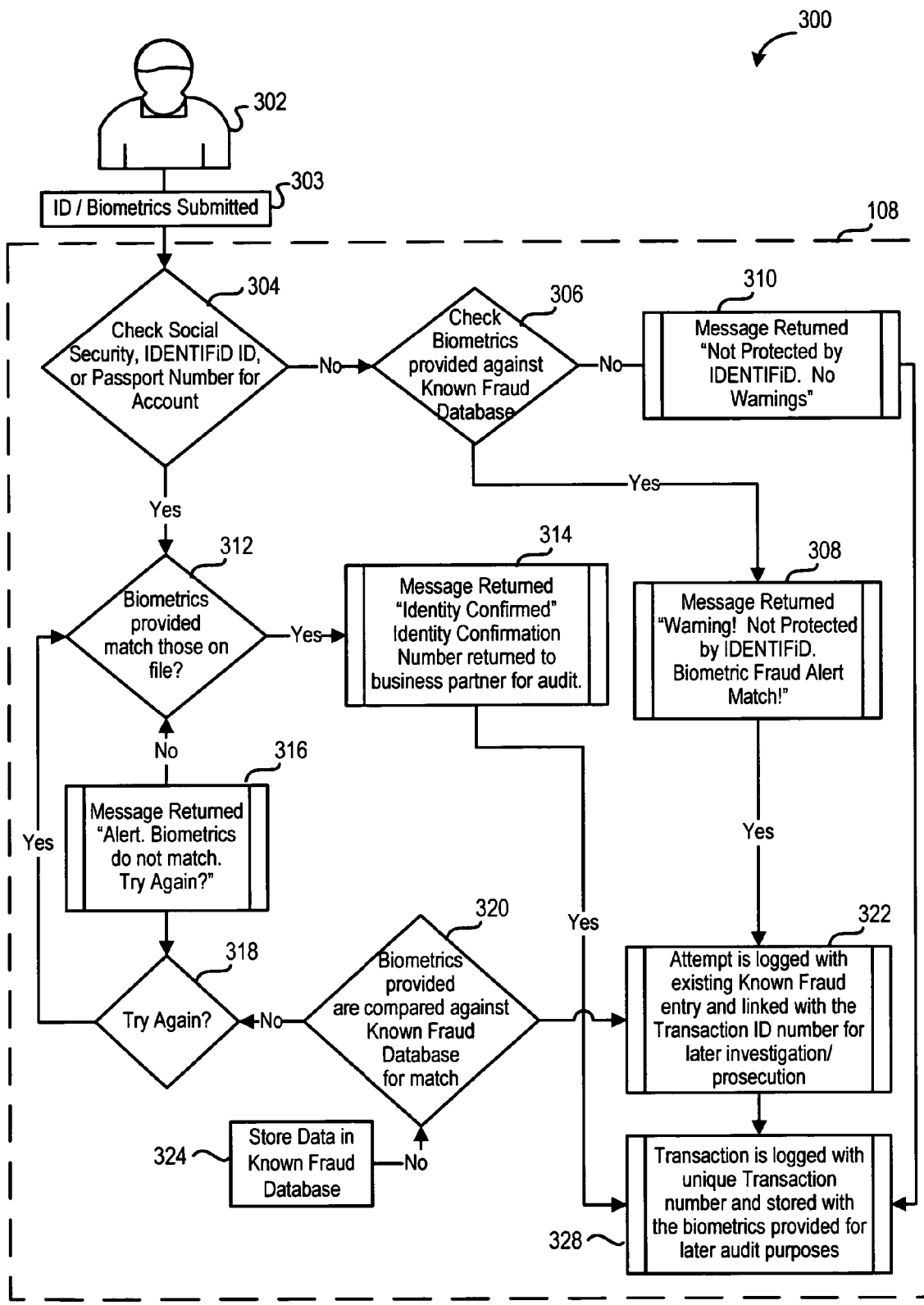
FIG. 3 is a work process diagram of an identity confirmation or denial functionality that may be provided by the identity confirmation agent.

FIG. 3 is a workflow diagram that shows one embodiment of an identity check process 300 which may be performed by the identity confirmation agent 108. An individual 302 presents herself to a business partner (not shown). The business partner obtains from the individual 302 putative identification information 303, such as an account number, social security number, driver's license number, or IDENTIFID identifier, together with biometric data that is obtained from the person of the individual 302. The business partner transmits the putative identification information 303 to the identity confirmation agent 108 for processing.

In step 304, the identity confirmation agent 108 analyzes the putative identification information 303 by checking the non-biometric component against the customer database 122. If there is no match, this indicates that the individual is not a customer. Then step 306 entails checking the biometric data against the known fraud database 124. If the biometric data matches an instance of biometric data in the known fraud database, then the identity confirmation agent 108 returns in step 308 a notice or signal to the business partner indicating that there is a match for fraud, and the business partner may proceed with its business as the business partner deems proper. If there is no known fraud match in step 306, the identity confirmation agent 108 returns to the business partner in step 310 a warning that the individual 302 is not an authorized customer, and again the business partner may proceed with an appropriate response.

If the outcome of non-biometric comparison in step 304 is that the information matches an authorized instance of such data in the customer database 122, step 312 entails checking to further confirm whether the biometric data obtained form the person of the individual 302 matches an authorized version of such biometric data stored in the customer database 122. If so, step 314 returns to the business partner a message or signal indicating that the identity of the individual 302 is confirmed as a customer. The business partner may proceed with it business according to this notice. On the other hand, the comparison of step 312 may determine that the incoming biometric data does not match the authorized version. In this instance 316, the identity confirmation agent 108 returns a message or signal informing the business partner that the biometrics did not match. This is an instance of possible fraud. The customer and business partner may at this time be given an opportunity 318 to resubmit the biometric data in the form of reacquisition of data from the person of the individual 302, or to provide a different type of biometric data, e.g., as an iris scan versus a fingerprint.

If the opportunity 318 is not given or is declined, step 320 entails comparing the biometric data against the known fraud database 124. If there is a match, the identity confirmation agent 108 in step 322 flags the event in association with the stored biometric data, creates an identifier linking the failed transaction with the business partner for use in a later prosecution or investigation by proper legal authorities. If there is no mach, the biometric data and other information provided by the individual 302 may be stored 324 in the known fraud database. Step 326 follows any one of steps 314 or 322 and stores audit trail information associated with any transaction, including all information received from the individual 302, time and date of the transaction or attempted transaction, confirm or deny outcome, and possibly other audit trail information.

Figure 4:
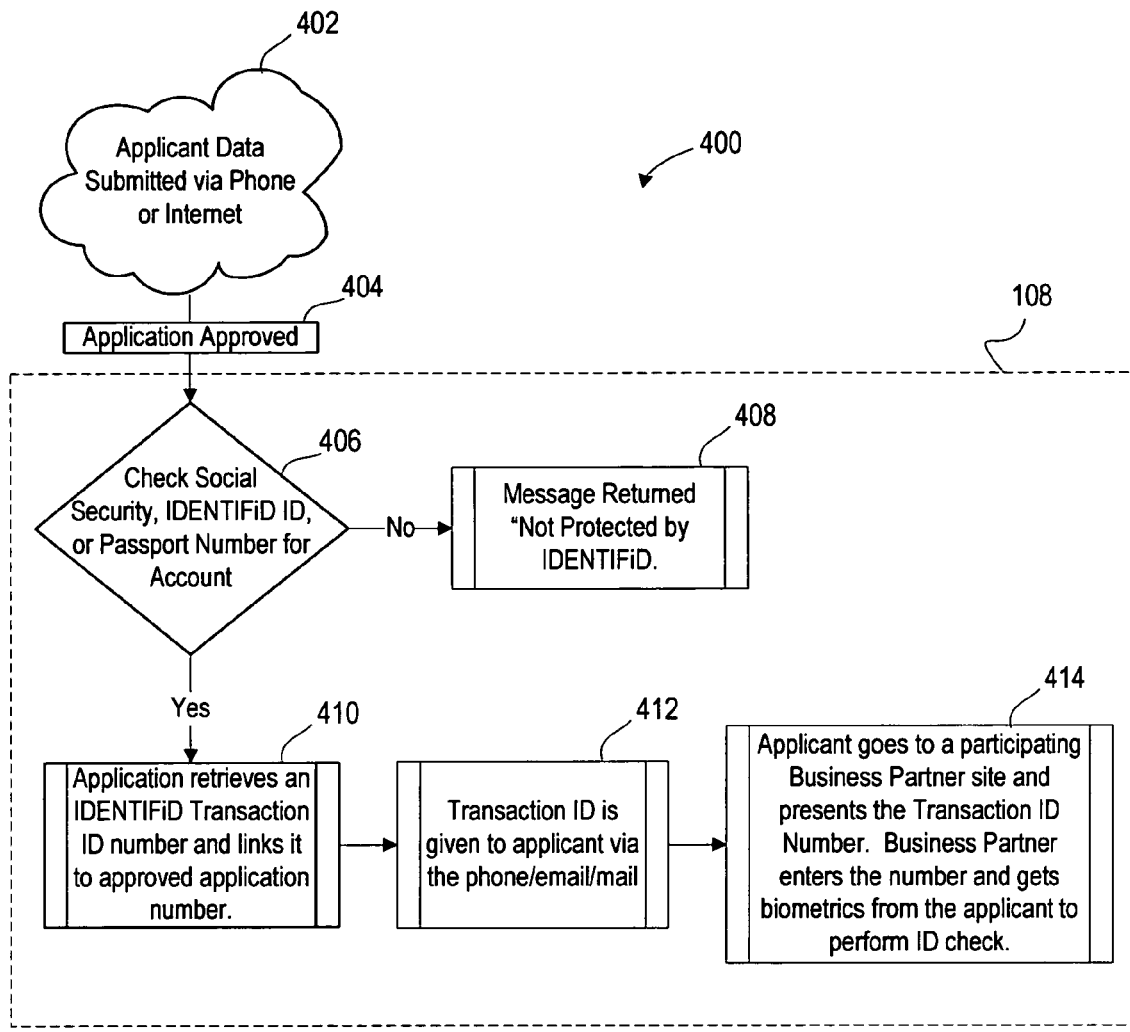
FIG. 4 is a work process diagram of a new application approval process that does not require a customer to be physically present as the application is processed and permits the identity confirmation agent to authorize the customer identity in a separate process to enable the processing of voice or electronically transmitted transactions.

It will be appreciated that a transaction may still proceed up to a point even if the individual 302 is not physically present for the approval process. This is shown in FIG. 4 as absentee process 400. An individual may, for example, submit 402 an application to a business partner via telephone or the Internet. Once preprocessing by the business partner approves 404 the application, the business partner may submit non-biometric information, e.g., a social security number, IDENTIFID identifier, or passport number, to the identification confirmation agent 108. Step 406 entails checking this information against the authorized version of such information stored on the customer database 122. If there is not match, the identity confirmation agent 108 returns 408 a message that the individual is not protected by electronic system 100. If there is a match, the identity confirmation agent 108 provides a transaction confirmation identifier in step 408 and stores this on the customer database 122 in association with the customer account information. In step 412, the transaction identifier is provided to the customer by telephone or email. The customer takes 414 this transaction confirmation identifier to the location of a participating business partner to complete the processing that is shown in FIG. 3. Typical uses of electronic system 100 in this mode may include, for example, mailed applications for credit cards or loans, Internet applications for credit cards or loans, telephone phone orders, setting up a new utility or phone service via telephone, loan broker transactions, batch authorization services, and verification service for mass mailing and internet application processing, where the transaction confirmation number may link the individual 302 to a class of persons receiving a particular offer.

It will be appreciated that authorization does not need to occur at the physical locations of the respective business partners. The identity confirmation agent 108 may provide a home web service for the identification functionality. In one example sensitive financial transactions may be served online during an Internet access session. Internet users may now purchase inexpensive biometric USB devices. These may be used in place of PINS and passwords to gain access to accounts, therefore increasing consumer confidence. This countermeasure defeats what has come to be known as "phishing" and data mining techniques that are sometimes used by criminals to deceive internet customers.

Figure 5:
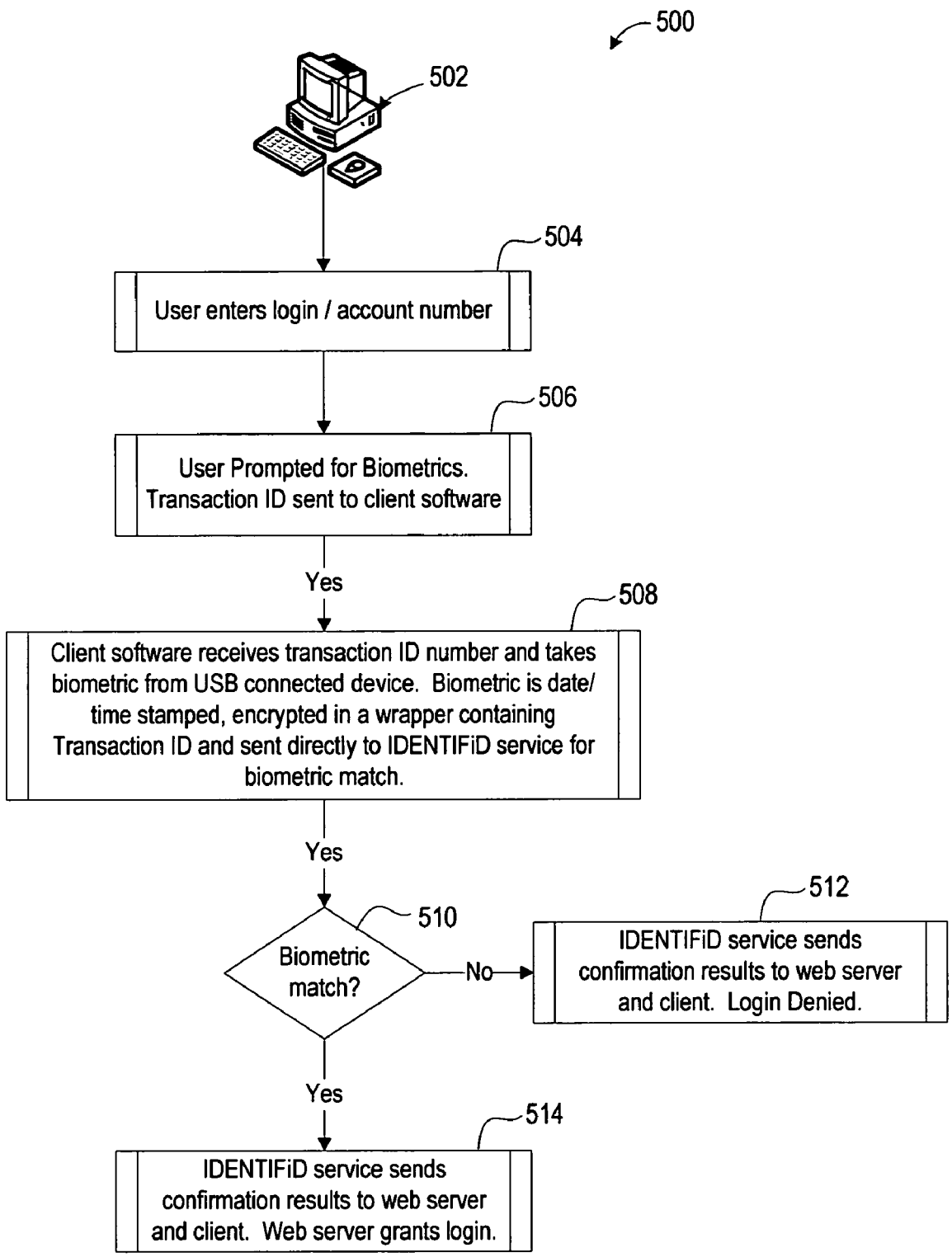
FIG. 5 is work flow diagram that shows use of a web-enabled identity authorization service where the customer need not be physically present at the location of a business partner to complete he transaction.

FIG. 5 is a flow diagram that illustrates one embodiment of an open Internet-based identity confirmation service 500. During the course of a transaction with client software that is operated by a business partner, a user 502 accesses the identity confirmation agent 108 and enters 504 a login or account number, such as the IDENTIFID identifier. The user 502 is prompted for biometrics, which are eventually obtained from the person of the user using a local biometric device, and the identity confirmation agent 108 provides a transaction identifier to the client software. In step 508, the client software receives the transaction identifier and receives biometric data that is obtained from the person of the user. The client software date and time-stamps the biometric data, encrypts the biometric data in a wrapper that contains the transaction identifier, and transmits the encrypted package to the identity confirmation agent 108. In step 510, the identity confirmation agent determines whether there is a biometric match with the authorized versions of biometric data stored on the customer database 122. If not, the identity confirmation agent 108 denies 512 confirmation results to the client software. If there is a match in step 510, the identity confirmation agent 108 confirms 514 identity to the client software. Typical uses of the identity confirmation agent 108 in this way include: online access to financial institutions (banking, trading stocks online; Internet applications for credit cards or loans, and e-commerce transactions.

Once a governmental, business or financial institution has registered for use of the identity confirmation agent 108, such institutions are authorized business partners. Each business partner is given a confidential Business Partner ID that is used to identity the authorized business partner. The Business Partner ID may be accompanied by a top level Business Partner Login and Password.

With the top level login and password, the business partner has the ability to login to the identity confirmation agent 108, for example, to submit applications, run identity checks and, in general, use the service. Business partners also have the ability to create additional 'subordinate' logins & passwords. These logins are needed to query the web service for identity checks and are tracked for audit purposes. The login can represent individuals or groups. Each login can have 'subordinate' logins and may be given creation and deletion rights to those logins under stratified different levels of access authority.

Figure 6:
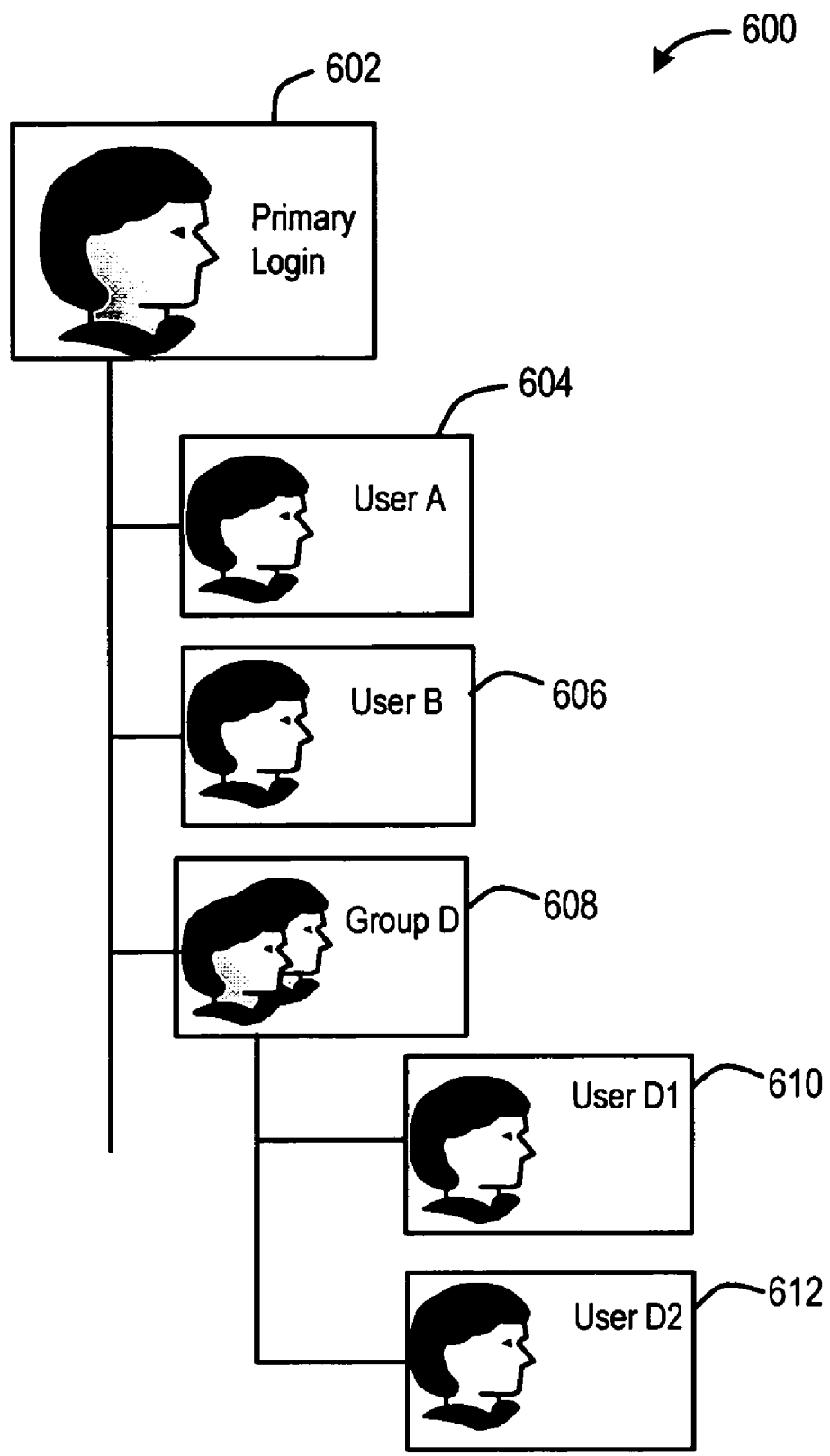
FIG. 6 shows a hierarchical login priority that facilitates secure authorized system access among stratified groups in a community of business partner users.

FIG. 6 shows one such scheme 600 of stratified login-based authority. A primary login 602 has control over all accounts below it. While users 604, 606 are permitted to login, they have no ability to add or delete logins. In like manner, a leader for Group 608 is not permitted to add or delete logins at the level of users 604, 606, but is permitted to add or delete sub-users 610, 612 from the Group 608 By organizing the login structure this way, business partners may self-determine the depth and structure of their use of the service. By assigning a group to a branch or department they can visually track logins. This also helps when tracking down a user from system audit information. By nesting groups within groups such as departments within branches, tracking employees and logins across multiple states or regions with multiple branches or sites at each becomes manageable Each Business Partner will decide how to implement their login strategy. From everyone using the default login password hard coded into the request, to each employee having their own and being prompted each time they use the system. The more elaborate the login structure, the more use the Partner will get from the audit information tracked in the system.

Each business partner may also need to decide if they want to hand the responsibility of maintaining such a potentially large structure down to the branches or maintain it at a central corporate level. In one example, a department head may be given the login and password of a group, and this allows the department head to use the login to maintain all logins for the employees in that group.

Each Business Partner may decide the level of confirmation service that they wish to employ. Some business partners may choose to rely on fingerprint verification alone, delaying the use of iris identification until the system has had greater acceptance with its clients or prices drop for the requisite hardware. This flexibility allows business partners to roll out iris confirmation in phases starting with their larger branches or regions first, spacing out any expenses.

Business partners may also decide what type of client software they will use to access the service as well, what level of integration into existing systems and how best to achieve that integration. This will be different for most business partners, and may comprise a mix of the various client options that are available. In this regard, it may for example be useful to implement a business partner module, such as a protocol converter and communications handling agent, on the local system of each business partner for purposes of interfacing with client software.

Software companies and consulting firms that provide commercial software products and services may register as authorized system partners. System partners may receive a development kit containing programming information that is needed to integrate their products with the identity confirmation agent 108. For large scale integrations into existing software, trained consultants from system partners are able to furnish the manpower that is needed to business partners who may not have available in-house talent or needing to farm out the work for the duration of the integration project. These efforts may be undertaken to integrate existing products with or without a conversion module for this purpose.

With this in mind, the provision or retrofitting of service partner software is preferably accomplished to provide data communications that are formatted in a predetermined data exchange protocol. The precise nature of the protocol is generally unimportant, so long as it is standardized. No matter what client software a business partner chooses to utilize, predetermined structures are sent to and received from the identity confirmation agent 108. Four main designs are prevalent in client software that may benefit from use of the identity confirmation agent 108. These include Client/Server, Thin Client, Standalone Applications, and server/Server:

1. Client/Server: This is typical software consisting of software installed on a computer and an optional component running on a server. The individual workstation directly places a request from the service and it is routed through the software running on a server. The server communicates directly with the service and passes responses on to the workstation.
2. Thin Client: This is Common in companies running in house web applications over an intranet. The setup is similar to the Client/Server but replaces the software installed on the workstation with HTML pages that may be accessed through the workstations web browser. The in-house web server running the intranet directly passes requests to the identity confirmation agent 108, and delivers responses through the browser interface.
3. Stand alone application: This includes a software package running on a single computer. All requests and response are handled by the software package directly. Many companies wanting to use the identity confirmation agent 108 will either have no network or no need for integration with existing software. A stand alone application inexpensively and quickly extends the service for this type of system.
4. Server/Server: This is a direct and automated connection between a server and the identity confirmation agent 108, and is usually a web server automatically requesting services without prompting of an individual or as part of an automated process. Although this type of configuration does not lend itself to the process of checking individual identities because no person is involved, this type of automation works well for mass mailing and credit card applications that have been approved and merely require verification of the identity, such that applicants may travel in person to a participating business partner to the in-person imaging of biometric data that is described above in context of FIG. 5.

In one embodiment, proxy servers may be used to send and receive all data requests. The proxy servers may receive all requests from client software and function as a sort of switchboard of the system, routing each request to the correct application service as described in the figures above and returning responses to the requesting client. The proxy servers provide an additional security function.

To enhance security of sensitive identification data and also protect the data from web based attacks such as viruses, only the proxy servers are exposed to the outside world. This design effectively removes the database servers 122. 124 from direct contact with any outside systems and stops any malicious behavior before it can harm the client's accounts. Since the proxy has no direct privileges over the data and application servers behind it, a possible attack would not be able to get further into the system.

Figure 7:
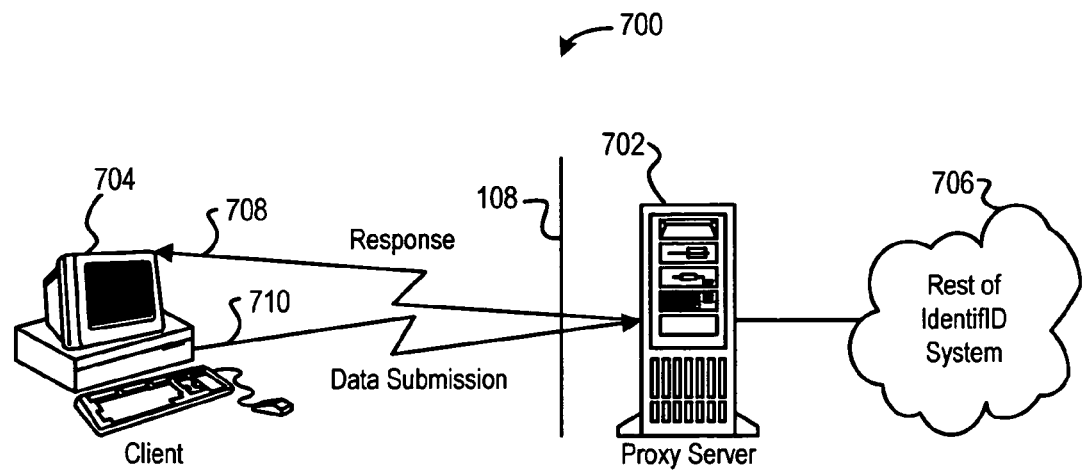
FIG. 7 shows a hardware setup for an identity confirmation agent that is equipped with a proxy server for additional security and data flow processing.

FIG. 7 shows one hardware configuration 700 that imposes a proxy server 702 between a client system 704 that is local to the business partner and the physical boundary of the identity confirmation agent 108. Servers, computers and generally the remainder of the identification agent 108 remain hidden behind the proxy server 702 and are presented in FIG. 7 as cloud 706. Responses 708 and data submissions 710 are routed through the proxy server 702 over any suitable telecommunications linkages, such as the Internet or secure direct lines.

Figure 8:
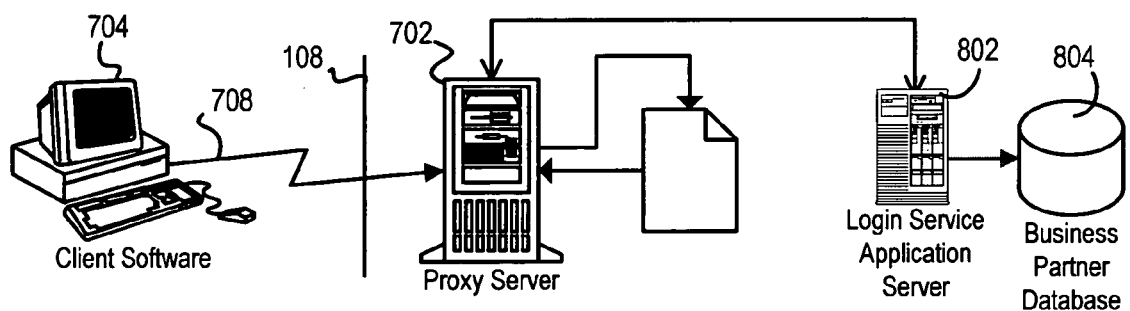
FIG. 8 shows how a proxy server may operate in additional detail with respect to FIG. 7.

As shown in FIG. 8, before processing any data 800 the proxy server 702 reviews the request for authenticity and confirms that all fields are complete with the expected type of information. Where the identity confirmation agent 108 permits a limited number of specific types of requests in a precise format, and as there is no change allowed to that structure, illegal or incorrect applications are immediately thrown out before any potential contamination to the system can occur.

This type of security check prevents unauthorized data requests and attacks from malicious code, which are easily be identified and disabled or discarded before the submitted data passes beyond the proxy server 702. For example, such malicious data or code would not reach a login service application 802 or a business partner database 804.

Figure 9:
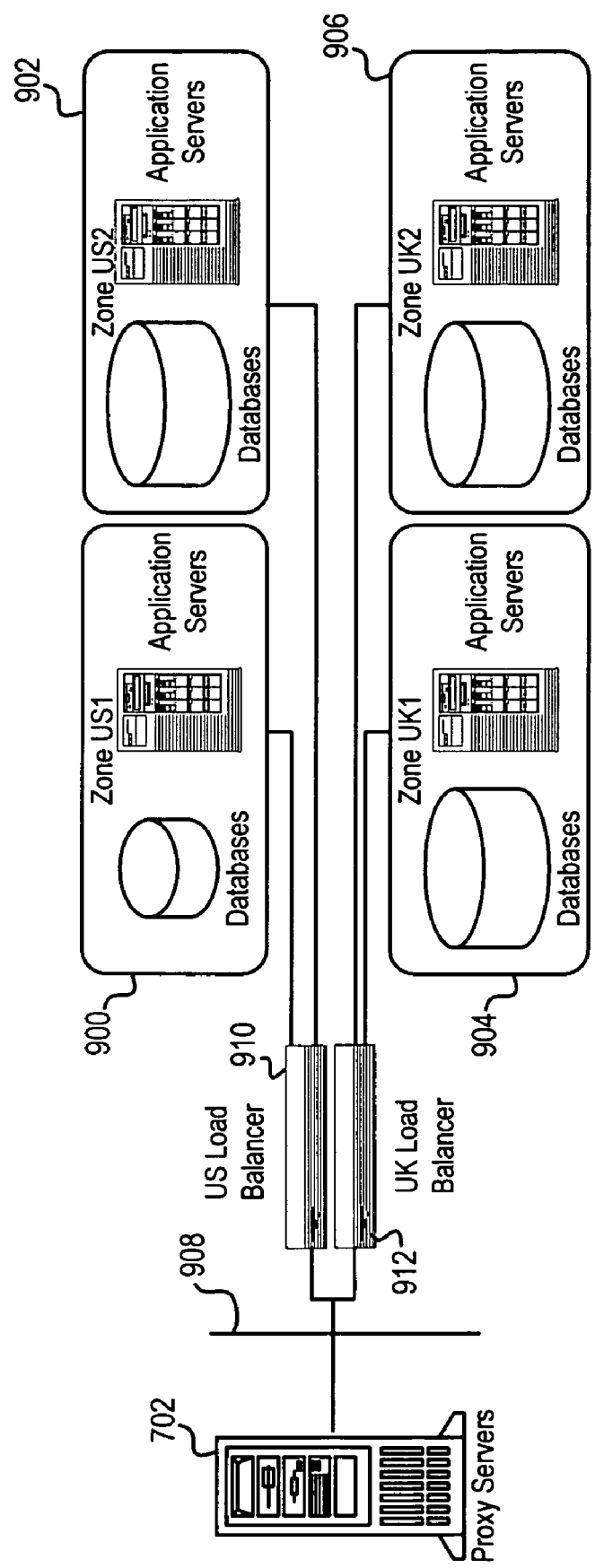
FIG. 9 shows how data and processing requests may be allocated to different zones of a distributed environment with involvement of a proxy server.

As shown in FIG. 9, various database and application servers 900, 902, 904, 906 may reside behind the proxy server 702. In FIG. 9, boundary 908 illustrates a barrier or firewall that exists due to the protection that is provided by the proxy server 702 as discussed in context of FIGS. 7 and 8. These are zoned into groups of replicated databases that may be distributed around a country or throughout the world. Replicated databases provide reliability because any zone or zones can be brought down and the remaining take over the workload. A proxy server 702 or group of such servers may identify the appropriate country and forwards the request to the appropriate one of database and application servers 900, 902, 904, 906. Load balancers 910, 912 receive process the incoming requests and distribute each to the most available zone.

Figure 10:
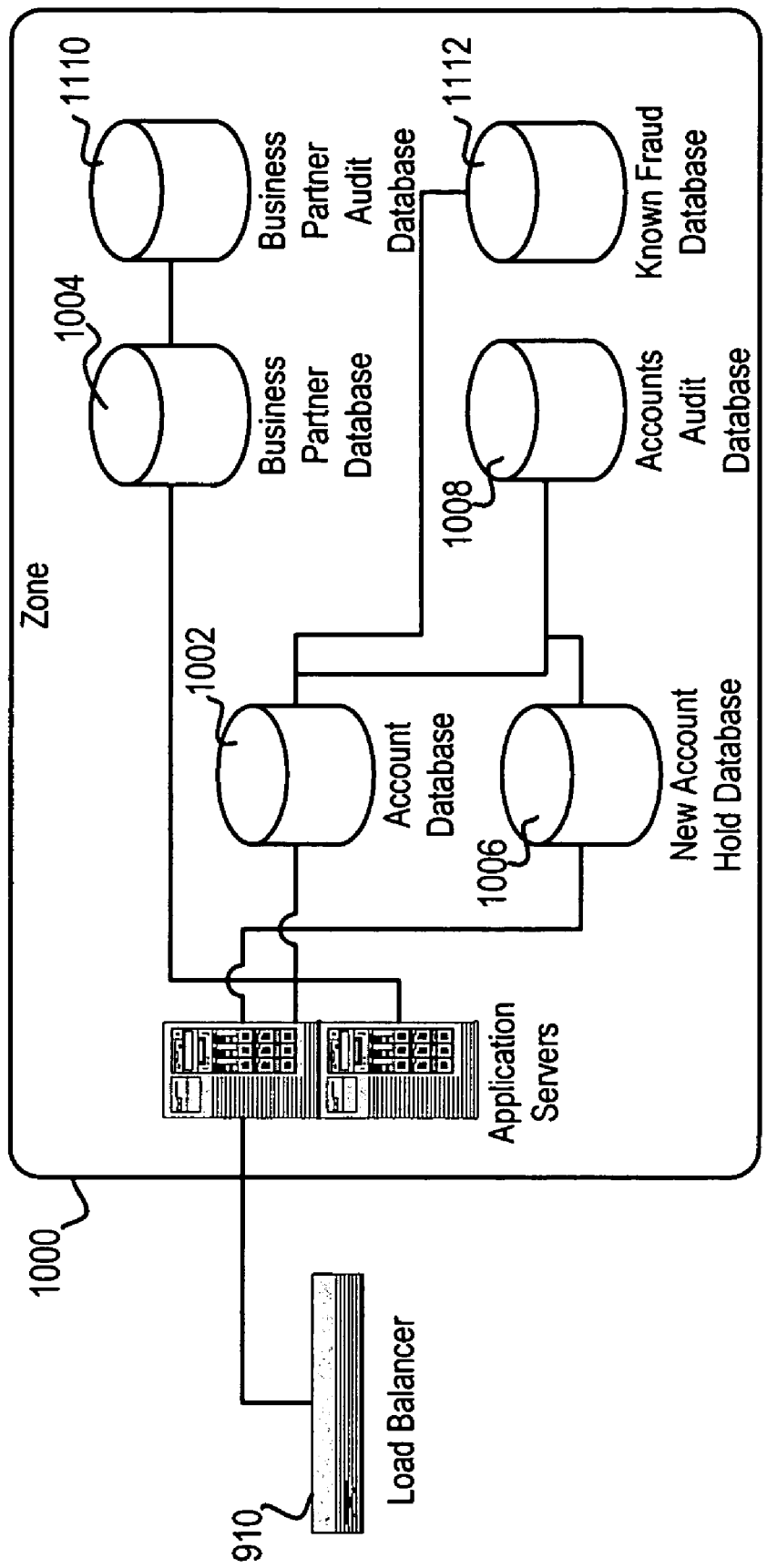
FIG. 10 shows a database arrangement that may be accessed by a load balancer for a particular zone or other allocation of work processing.

As shown in FIG. 10, each zone such as zone 1000 that is accessible to a particular load balancer 910 may contain various additional databases and the application servers that drive the functionality of the identity confirmation agent 108, this in a distributed manner as compared to FIG. 1. Separate databases may track the full list of user accounts 1002 for any particular country and the business partners 1004 for that country. New accounts 1006 waiting for identity confirmation may be kept in a separate database until confirmed. Audit databases 1008, 1110 may track every identity check, change of data request, who made them and when. A know fraud database 1112 may be used in the manner described above.

This design allows for very modular expansion. If the proxy servers are being overworked, another one may be easily added to the system to instantly relieve the others. If any of the application servers are getting too busy, another application server added to the zone to offload some of the processes and queries. If any database begins to slow down from growth or heavy use, an additional database server can be added to the system to help with the congestion. By expanding this way, additional resources are targeted at the specific application or database needing the performance boost. If any country is slowing down overall another zone can easily be added into the country instantly increasing performance as well as uptime. Accordingly, the identity confirmation agent 108 is shown to be a functionality that is made up of several components each running as individual services, a design that allows for greater performance, flexibility, as well as upgradeability. Each of these services is designed to provide specific functions to the overall system. These components may be installed in a single integrated system from a central location, or in a distributed processing and databasing environment.

Although each service constituting the identity confirmation agent 108 has a specific function and may use unique data fields, there are several fields common to each service and included in each and every data and service request. Table 5 lists various aspects of system functionality that may be provided according to the instrumentalities that are discussed above. These functionalities may be provided by program instructions, hardware, circuitry, and combinations thereof.

TABLE 5

Identity Confirmation Agent Functionality

| Functionality | Description |
|---|---|
| Business Partner ID | Default for all employees, hard coded into request. Identifies Business Partner. |
| Business Partner Login | Either default or setup by business partner to identify branch or even individual employee making entry |
| Business Partner Password | Again either the default or setup to match either branch or employee login. |
| Type of request | Application, Application Confirm, ID check, Pre-approval Confirmation, or 3$^{rd}$ party check |
| Type of Confirmation | (Blank for account Applications): Photograph, Fingerprint, Iris, Voice |
| IP address of submitting computer | Setup IP address for routing of communications |
| Audit trail | Date and time stamp tracking of all system transaction events |

As described above, all data requests preferably pass through the proxy servers. These receive all requests from client software and function as a sort of switchboard of the system, routing each request to the correct Application Service and returning responses to the requesting client. In this process, the proxy server receive a data request, confirms that all fields are complete as expected, checks for data length in each field, and checks for imbedded SQL commands. Under these check parameters if the check fails, the proxy server returns an error message and logs the information for audit. If the request is authorized, the proxy server reads the country from the request and forwards selected information for login at the appropriate zone including, for example, Business Partner ID, Business Partner Login, and Business Partner Password to correct country's Login Check service. If the login fails, the proxy server returns an error message and logs information for audit. If the login succeeds, the proxy server registers login authorization ID, and forwards request to correct country and business service. If such action is appropriate for the type of request, the proxy server waits or is polled for responses from the zone server to return such responses to the client software.

Table 6 provides additional information that may be used to supplement the description of the foregoing processes.

TABLE 6

System functionalities

| Class of Functionality | Sequential Processing Description |
|---|---|
| Login Check (Proxy) | 1. Receives request from Proxy Server for confirmation.<br>2. Checks Business Partner ID against Business Partner Database.<br>3. If check fails, returns rejection, logs attempt in audit database.<br>4. If passes, checks Business Partner Login, and Business Partner Password against Business Partner Database.<br>5. If check fails, returns rejection, logs attempt in audit database.<br>6. If passes returns authorization number to Proxy Server, logs attempt in audit database. |
| Business Partner Maintenance (Agent) | 1. Receives request from Proxy Server<br>2. Verifies Login check authorization<br>3. Queries Business Partner Database, Business Partner ID and Business Partner Login<br>4. Returns Login information for Business Partner Login given and any logins maintained by it to Proxy Server.<br>5. Waits for any change requests by same Login Authorization ID and updates database accordingly. |
| New Account Creation (Agent) | 1. Receives request from Proxy Server<br>2. Verifies Login check authorization.<br>3. Data is entered into the New Account Holding database.<br>4. Queries Accounts Database for duplicate social security number in existing account.<br>5. Queries Known fraud Databases for existing fraud alerts.<br>6. If duplicate found, notifies proxy and copies both sets of records to alert database for investigation into fraudulent duplicate account.<br>7. If no duplicates found, Generates Confirmation ID.<br>8. Returns 'Application Approved' message to Proxy to forward to submitting client.<br>9. Data is moved into Accounts Database |
| Account Maintenance (Agent) | 1. Receives request from Proxy Server.<br>2. Verifies Login check authorization.<br>3. Request identity confirmation from business partner, either by fingerprint or photograph.<br>4. If check fails, returns rejection, logs attempt in audit database with attempted fingerprint if provided.<br>5. If identity confirmed, returns current account information to client.<br>6. Waits for any change requests by same Login Authorization ID and updates database accordingly. |

TABLE 6-continued

System functionalities

| Class of Functionality | Sequential Processing Description |
|---|---|
| Confirmation ID:<br>(Generator) (Agent) | 1. Receives request from application service.<br>2. Verifies Login check authorization.<br>3. Generates unique Confirmation ID and returns it to requesting application service.<br>4. Logs confirmation ID with application type and application ID provided by requesting applications service. |
| Confirmation ID:<br>(Retriever) (Agent) | 1. Receives lookup request from application service.<br>2. Verifies Login check authorization.<br>3. Queries Confirmation ID database for match on Confirmation ID provided.<br>4. If check fails, returns rejection, logs attempt in audit database.<br>5. If match found, returns application type and application ID stored with Confirmation ID to requesting application service. |
| ID Check (Standard)<br>(Agent) | 1. Receives request from Proxy Server.<br>2. Verifies Login check authorization.<br>3. Queries Account database for match on social security number provided<br>4. If match fails, returns rejection - no IDENTIFiD account, logs attempt in audit database.<br>5. If match made, compares address and other data on file for match<br>6. If match fails, returns rejection - not matching information, logs attempt in audit database.<br>7. If match made, request identity confirmation from business partner either by fingerprint or photograph.<br>8. If check fails, returns rejection, logs attempt in audit database with attempted fingerprint if provided.<br>9. If identity confirmed, returns approval code to client.<br>10. If Business Partner clicks 3rd Party Authorization, queries Confirmation ID service for Confirmation ID.<br>11. Returns Confirmation ID number to Business Partners to be given to customer or 3rd party authorizer.<br>12. Status on application remains pending awaiting 3rd party Confirmation ID check. |
| ID Check<br>(Confirmation)<br>(Agent) | 1. Receives request from Proxy Server.<br>2. Verifies Login check authorization.<br>3. Queries Confirmation ID service for match on Confirmation ID number provided.<br>4. If match fails, returns rejection, logs attempt in audit database.<br>5. If match made, queries correct database based on application type returned by Confirmation ID service to find match on application ID.<br>6. Requests identity confirmation from business partner, either by fingerprint or by photograph.<br>7. If check fails, returns rejection, logs attempt in audit database with attempted fingerprint if provided.<br>8. If identity confirmed, returns approval code to client and stores approval code with application. |

The most common form of identity check occurs when an individual attempts to open an account at a business partner's location. After approving the account or service, the business partner submits the data given on the application to the identity confirmation agent 108 for confirmation. Upon receipt the Proxy Server check the request for authenticity. It then checks the Login Service and upon authorization sends the data to the ID Check Service. The ID Check Service prompts the Business Partner to select to confirm identity now or $3^{rd}$ Party Confirmation.

If the Partner selects now, the ID Check Service looks at the Type of Confirmation field in the submission to determine its next move. If it is:

Photograph: The service returns the photograph on file to the partner and prompts them to confirm the identity.

Fingerprint: The service prompts the partner to have the applicant place their finger on the scanner, tries to match the print given to the print on file.

Iris: The service prompts the partner to have the applicant look at the iris camera, tries to match the iris photograph given to the biometric template on file.

If the Partner selects third Party confirmation, the service obtains a Confirmation ID for the application and returns it to the partner to be given to the applicant or $3^{rd}$ party directly if possible.

For applications taken over the Internet or from responses to a mass mailing, business partners can still confirm the identities on the applications they approve. Business partners are able to send a batch of approved applications and receive a Confirmation ID in return. On the acceptance letter or email to the customer, the Confirmation ID will be listed, prompting the approved applicant to go to a participating IDENTIFiD site to confirm their identity and activate the account. When done, a notice will be sent to the financial institution releasing the card or account.

This type of authorization works well with the third party identity check service, as utility companies taking phone orders for new service, or financial institutions offering loans through brokers or other sources.

In some cases the individuals requesting a loan or service are not physically present at the business or financial institution granting the loan or providing that service. In the case of car dealerships, when a person wishes to purchase a car the dealership goes to several banks and other lending institutions to find the best deal available. The lending institution may never see the individual personally. When the dealership informs the selected bank that the individuals are going to accept the loan, the bank runs an identity check; when prompted to verify the identification, they select third party identification and the system returns a Confirmation ID to be given to the dealership. The dealership then pulls up the Confirmation ID on their system and proceeds to verify identification.

I claim:

1. An electronic system for the processing of data to verify the identity of an individual, comprising:

means for preauthorizing a group of customers by storing an authorized version of biometric data and an authorized version of non-biometric data that may be used to verify the identity of individual customers;

means for obtaining data from the person of an individual who wishes to engage in a transaction, the data including test biometric data and test non-biometric data that may be used to identify the individual; and means for transmitting the data to a central agency;

the central agency being provided with means for processing the data to determine whether the individual is also a preapproved customer, wherein the manner of processing at least includes comparing the test biometric data against the authorized version of biometric data such that a comparison match outcome is associated with recognition of the individual as a customer and a comparison non-match outcome is associated with nonrecognition of the individual as a customer;

means for providing notification of the comparison match outcome; and a fraud database including at least one of hardware and circuitry, the fraud database containing historical biometric data which is associated with known or suspected instances of past fraud and means for comparing the test biometric data against the historical biometric data on a transaction specific basis to obtain a comparison outcome wherein a comparison match is associated with means for providing notice that the test biometric data is associated with an instance of past fraud from a person who is not a preauthorized customer but who is known to have previously committed fraud.

2. The electronic system of claim 1, wherein the means for preauthorizing includes means for obtaining the authorized version of biometric data from customer applicants.

3. The electronic system of claim 1, wherein the authorized version of biometric data and the test biometric data each include at least one category of data selected from the group consisting of fingerprint, palm, face, and iris data.

4. The electronic system of claim 1, wherein the means for obtaining includes a biometric scanner in the individual's home.

5. The electronic system of claim 1, wherein the means for obtaining includes a biometric scanner in a place of business.

6. The electronic system of claim 1, wherein the means for transmitting includes an operable connection to the Internet.

7. The electronic system of claim 1, wherein the central agency processes the test non-biometric data to determine a data work flow before engaging in the comparison analysis of biometric data.

8. The electronic system of claim 1, wherein the type of transaction facilitates a function selected from the group consisting of credit card applications; loan applications; opening savings or checking accounts; accessing savings or checking accounts; activating new cellular phone service; obtaining new insurance; obtaining government documents; renting housing; receiving medical care; confirming employment applications; car dealership transactions; safety deposit boxes; medical applications including access to medical records, prescriptions, and patient tracking; government programs including passports or visas; entitlement programs; frequent traveler programs; prisoner tracking; and tax filings.

9. The electronic system of claim 1, wherein the type of transaction facilitates access to a secure facility.

10. The electronic system of claim 1, wherein the type of transaction facilitates processing of a passport or visa to facilitate granting or denying admittance of the individual to a country.

11. The electronic system of claim 1, wherein the central agency is equipped with a proxy server that provides means for protecting the central agency against malicious attack.

12. The electronic system of claim 11, wherein access to the central agency is controlled by at least one proxy server and further comprising a distributed environment where data processing is divided among a plurality of zones on the basis of geographical association to the data.

13. A method for processing data to verify the identity of an individual, comprising:

preauthorizing a group of customers by storing an authorized version of biometric data and an authorized version of non-biometric data that may be used to verify the identity of individual customers;

obtaining data from the person of an individual who wishes to engage in a transaction, the data including test biometric data and test non-biometric data that may be used to identify the individual; and transmitting the data to a central agency;

the central agency processing the data to determine whether the individual is also a preapproved customer, wherein the manner of processing at least includes comparing the test biometric data against the authorized version of biometric data such that a comparison match outcome is associated with recognition of the individual as a customer and a comparison non-match outcome is associated with nonrecognition of the individual as a customer;

providing notification of the comparison match outcome;

creating a fraud database that contains historical biometric data which is associated with known or suspected instances of past fraud from a person who is not a preauthorized customer but who is known to have previously committed fraud;

comparing the test biometric data against the historical biometric data on a transaction specific basis to obtain a comparison outcome; and providing notice in the case of a comparison match outcome that the outcome is associated with an instance of past fraud.

14. The method of claim 13, wherein the step of preauthorizing includes obtaining the authorized version of biometric data from customer applicants.

15. The method of claim 13, wherein the authorized version of biometric data and the test biometric data each include at least one category of data selected from the group consisting of fingerprint, palm, face, and iris data.

16. The method of claim 13, wherein the step of obtaining includes using a biometric scanner in the individual's home.

17. The method of claim 13, wherein the step of obtaining includes using a biometric scanner in a place of business.

18. The method of claim 13, wherein the step of transmitting includes an operable connection to the Internet.

19. The method of claim 13, wherein the step of processing at the central agency includes using the test non-biometric data to determine a data work flow before engaging in the comparison analysis of biometric data.

20. The method of claim 13, wherein the type of transaction facilitates a function selected from the group consisting of credit card applications; loan applications; opening savings or checking accounts; accessing savings or checking accounts; activating new cellular phone service; obtaining new insurance; obtaining government documents; renting housing; receiving medical care; confirming employment applications; car dealership transactions; safety deposit boxes; medical applications including access to medical records, prescriptions, and patient tracking; government programs including passports or visas; entitlement programs; frequent traveler programs; prisoner tracking; and tax filings.

21. The method of claim 13, wherein the type of transaction facilitates access to a secure facility.

22. The method of claim 13, wherein the type of transaction facilitates processing of a passport or visa to facilitate granting or denying admittance of the individual to a country.

23. The method of claim 13, wherein the central agency is equipped with a proxy server that provides means for protecting the central agency against malicious attack.

24. The method of claim 13, further comprising a step of controlling access to the central agency by using at least one proxy server in a distributed environment where data processing is divided among a plurality of zones on the basis of geographical association to the data.

* * * * *